(12) United States Patent
Highman et al.

(10) Patent No.: US 6,923,995 B2
(45) Date of Patent: Aug. 2, 2005

(54) RICE PROTEIN CONCENTRATE BASED ORGANIC NUTRITIONAL FORMULA

(76) Inventors: Jay C. Highman, 445 Meacham Run, Westerville, OH (US) 43081; Jeffrey Wayne Liebrecht, 1117 Havendale Dr., Columbus, OH (US) 43220-5030

( * ) Notice: Subject to any disclaimer, the term of this patent is extended or adjusted under 35 U.S.C. 154(b) by 349 days.

(21) Appl. No.: 10/107,944

(22) Filed: Mar. 27, 2002

(65) Prior Publication Data

US 2003/0185941 A1 Oct. 2, 2003

(51) Int. Cl.$^7$ .................... A23L 1/0526; A23L 1/0534; A23L 1/304
(52) U.S. Cl. .............................. 426/72; 426/73; 426/74; 426/573; 426/590; 426/618; 426/601; 426/654
(58) Field of Search .............................. 426/72, 73, 74, 426/573, 590, 618, 601, 654

(56) References Cited

U.S. PATENT DOCUMENTS 5,340,603 A * 8/1994 Neylan et al. ................. 426/73
6,120,814 A * 9/2000 Highman et al. ............. 426/72
6,475,539 B1 * 11/2002 DeWille et al. ............... 426/72

FOREIGN PATENT DOCUMENTS

JP 62036169 A * 8/1985
WO 01/06874 A1 * 1/2001

* cited by examiner

*Primary Examiner*—Helen Pratt
(74) *Attorney, Agent, or Firm*—Donald D. Nickey

(57) ABSTRACT

This invention relates to a nutritional beverage substantially free of chemical pesticides, antibiotics, hormones, herbicides, non-genetically modified plants and chemical solvents that utilizes organic brown rice syrup and organic rice protein concentrate as major components and a source of calcium selected from various calcium salts, including mono-, di- or tricalcium phosphate, calcium lactate gluconate and mixtures thereof. The beverage preferably also contains water soluble vitamins, oil soluble vitamins and flavors. The use of rice protein concentrate stabilized with a blend of guar and CMC gums, and brown rice syrup provides a beverage with a smooth texture, a pleasant taste and a light, refreshing mouthfeel. The beverage also has excellent physical stability over shelf life.

7 Claims, No Drawings

RICE PROTEIN CONCENTRATE BASED ORGANIC NUTRITIONAL FORMULA

TECHNICAL FIELD

This invention relates to an improved nutritional formula which is "organic" and possesses highly acceptable taste and mouth feel. The nutritional formula uses organic brown rice syrup as the major source of carbohydrates, non-solvent extracted edible oils as the source of lipids, and organic rice protein concentrate as the source of protein.

BACKGROUND OF THE INVENTION

A number of certification boards and some states, such as California, have procedures and regulations that must be followed for a food ingredient or food product to be labeled as "organic". One such board is the National Organic Standards Board (NOSB). The NOSB prohibits organic growers from using chemical pesticides, herbicides or fertilizers on their land for at least three years. NOSB standards currently allow up to 5 percent of the ingredients in nutritional products labeled "organic" to be non-organic, provided those ingredients are not widely available in organic form or on the USDA list of prohibited materials. The growing popularity of organic foods has reached a national level as well. For example, the United Stated Department of Agriculture's final national organic rule became effective on Apr. 21, 2001. There must be compliance with this law by Oct. 21, 2002.

The consuming public is aware that organic foods reduce the health risks associated with consuming foods that are tainted with chemical solvents, pesticides, herbicides, and the like. While adults can carefully choose their source of nutrition, infants, toddlers and children are forced to consume liquid formulas that are not organic. One aspect of the present invention is directed to an infant formula and a nutritional beverage for toddlers and children that is greater than 95% organic. The invention is also directed to a "non-dairy" formulation based on organic rice protein concentrate as the sole source of protein. The invention is also directed to a method to prepare such nutritional beverages.

Conventional infant formulas are derived, to a large extent, from cow's milk. After being diluted, the cow's milk may be enriched with whey proteins, diverse carbohydrates such as lactose, dextrin, sucrose, maltose and starches, different mixtures of vegetable and animal fats, and fortified with vitamins and minerals. These components are present in suitable amounts to meet the requirements of low birth weight newborns or term healthy infants as a sole source of nutrition during the first and second semesters of life.

Sometimes, infant formulas also contain isolated milk proteins, isolated vegetable proteins or protein hydrolyzates, from diverse sources such as casein, lactalbumin, soy and meat. Also, these infant formulas have one or more carbohydrates (sucrose, dextrin, maltose and starch), mixtures of diverse kinds of fats, minerals and vitamins, to meet not only the healthy newborns' nutritional requirements, but also of infants and children with clinical symptoms of lactose intolerance, protein intolerance and, in general, with diverse malabsorption-malnutrition syndromes.

Rice protein, which has been a part of the human diet for over 10,000 years, is a non-animal source of nutrition, produces no known allergic reactions, no flatulence factor, and is a pleasant tasting alternative to diary and soy sources of protein. Diary proteins are animal based and can be difficult to digest. Soy proteins can also be difficult to digest and can have an undesirable beany, astringent flavor.

The typical composition of organic rice protein concentrate is approximately 5.8% fat; 5.3% carbohydrate (of which 2.6% is dietary fiber, 0% sugars and 2.7% other carbohydrates); 84.4% protein; 5% moisture; 2% ash.

Rice protein is a complete protein in that it contains all of the nine essential amino acids as well as all of the other non-essential amino acids. The protein efficiency ratio (PER) is the measure of the actual protein available for the body to use. This PER is related to the percentage of the protein digested by the body. The approximate PER of rice protein is 2.75.

The European Society of Pediatric Gastroenterology and Nutrition (ESPGAN), the American Academy of Pediatric (AAP), the Codex Alimentarius Mundi, and the European Community Council, among other organizations, have set forth general guidelines for the composition of infant formulas.

As used herein, the term "infant formula" is intended to refer to the well established understanding as defined in the United States Infant Formula Act, (106 and 107 C.F.R.). The term "organic"is intended to refer to a food that complies with the Federal Organic Foods Production Act (1990) or the California Organic Foods Act of 1990 or those certified by the National Organic Standards Board.

Nutritional products, other than infant formulas, such as those currently used in hospitals, are based on the utilization of diverse protein sources (caseins, sodium and calcium caseinates, isolated milk and soy proteins, protein hydrolyzates and/or crystalline amino acids), mixtures of vegetable and animal fats, carbohydrates (basically glucose polymers), vitamins and minerals to meet, at least, the dietary intakes recommended for healthy individuals (Committee on Dietary Allowances, Food and Nutrition Board, Nat. Acad. Sci., 9th Ed, 1980).

Protein energy malnutrition (PEM) is found in many patients admitted to hospitals. This happens not only in developing countries, but also in those with a high socio-economic level. Proper nutritional support for such patients, while not a primary mode of treatment is, nevertheless, an important factor for therapy and recovery. It is, therefore important to administer a nutritionally balanced organic diet free of contaminates such as pesticides and herbicides, adequate to meet the needs of the patient. This is especially true for those patients where conventional feeding is contra-indicated (gastroenterological patients) or is insufficient (hypercatabolic patients). Further, these patients are at greater risk for developing complications that are associated with foods contaminated with pesticides, herbicides and chemical solvents.

BACKGROUND ART

Numerous nutritional formulas have been developed and patented over the years. Representative formulas are disclosed in the following U.S. Pat. No. 6,120,814 to Highman et al.; U.S. Pat. No. 4,544,559 to Gil et al.; U.S. Pat. No. 4,670,268 to Mahmoud; U.S. Pat. No. 4,994,442 to Gil et al.; U.S. Pat. No. 5,021,245 to Borschel et al.; U.S. Pat. No. 5,066,500 to Gil et al.; U.S. Pat. No. 5,340,603 to Neylan et al.; U.S. Pat. No. 5,492,899 to Mason et al.; U.S. Pat. No. 5,700,590 to Mason et al.; and U.S. Pat. No. 5,709,888 to Gil et al. The teachings of these patents, as they evidence the state of the art, are herein incorporated by reference.

While much work has been done to prepare various nutritional formula, there has been little effort put forth to develop an organic nutritional formula based solely on rice proteins. It is thus apparent that a need exists for a pleasant tasting organic nutritional formula that will provide significant levels of nutrition free of casein, whey and soy proteins, lactose free, corn gluten free which is also vegan (no animal derived ingredients or byproducts) and hypo-allergenic.

DISCLOSURE OF THE INVENTION

There is disclosed a nutritional formula, said formula comprising: 1) organic rice protein, said protein being of a concentration of between 10 and 30 grams per liter of formula; 2) organic lipid, said lipid being of a concentration of between 20 and 55 grams per liter of formula; 3) organic carbohydrates, said carbohydrates being of a concentration of between 50 and 110 grams per liter of formula; 4) vitamins; 5) minerals; and 6) a stabilizer system. As used herein and in the claims the values reported per liter of formula are for a ready to feed (RTF) liquid nutritional.

The protein has as its source organic rice protein concentrate; said lipid has as its source organic soy, coconut, high oleic sunflower oil or another organic vegetable oil or a blend thereof; and said carbohydrates have as their source organic brown rice syrup, corn syrup, glucose polymers, other carbohydrates or blends thereof. Preferably, the source of carbohydrates is brown rice syrup.

Preferably, the protein is of a concentration of between 15 and 25 grams per liter of formula, said lipid is of a concentration of between 25 and 50 grams per liter of formula, and said carbohydrates are of a concentration of between 50 and 110 grams per liter of formula. More preferably, said protein is of a concentration of between 17 and 23 grams per liter of formula, said lipid is of a concentration of between 32 and 42 grams per liter of formula, and said carbohydrate, preferably brown rice syrup, is at a concentration of between 65 and 85 grams per liter of formula.

In a preferred embodiment of the invention, said protein is of a concentration of approximately 20 grams per liter of formula and has as its source rice protein concentrate; said lipid is of a concentration of approximately 37 grams per liter of formula and has as its source a blend of soy lecithin, soy oil, coconut oils, and high oleic sunflower oil; and said carbohydrate is of a concentration of approximately 75 grams per liter of formula. The preferred sources of carbohydrates are brown rice syrup. In this formula, the lipids provide up to 45% of the calories and the carbohydrates provide up to 50% of the calories in the formula.

A natural property of rice protein concentrate is its relative insolubility in water due in part to the protein complexing with fiber. To minimize this defect, a stabilizer system consisting of a blend of guar and carboxymethylcellulose (CMC) gums helps stabilize the proteins by complexing with and stabilizing the rice protein in the mixture upon powder reconstitution with water. The preferred range of use is 0.20 to 0.40% by weight of the powder, with a preferred level of 0.30% by weight of the powder.

The formula has as its preferred protein source organic rice protein concentrate; said lipid has as its source organic soy oil, organic coconut oil, organic high oleic sunflower oil and soy lecithin; and said carbohydrate is preferably organic brown rice syrup.

There is further disclosed an organic nutritional beverage comprising:
a) organic rice protein concentrate;
b) tricalcium phosphate;
c) brown rice syrup;
d) high oleic sunflower oil;
e) coconut oil;
f) soybean oil;
g) soy lecithin;
h) natural flavor;
i) oil soluble vitamins;
j) water soluble vitamins; and
k) a stabilizer system.

There is further disclosed an organic nutritional beverage additionally containing at least one or both of eicosapentaenoic acid (EPA) and docasahexaenoic acid (DHA).

There is also disclosed a ready-to-feed nutritional beverage comprising:
a) water;
b) from about 1.5 to about 4.5 gms of organic rice protein per 100 kcal of beverage,
c) from about 5.5 to about 15 gms of an organic brown rice syrup per 100 kcal of beverage; and
d) from about 0.1 to about 0.5 gms per 100 kcal of a source of calcium selected from various USP mineral sources such as mono, di and tricalcium phosphate, calcium citrate, calcium lactate gluconate and mixtures thereof.

The beverage may also contain oil soluble vitamins and/or water soluble vitamins. The pH of the RTF beverage is preferably in the range of 6.6 to about 6.8.

SUMMARY OF THE INVENTION

The present invention is directed to an organic nutritional beverage wherein the beverage may be in the ready-to-drink form (single strength), as a concentrate or as a powder. The beverage according to the invention preferably contains water soluble vitamins such as pantothenic acid, biotin, vitamin $B_{12}$, folic acid, vitamin $B_6$, niacin, vitamin $B_2$, vitamin $B_1$ and bioavailable iron, a stabilizer blend, and oil soluble vitamins. The pH of the nutritional beverage in the range of from about 6.0 to about 8.0, with a pH of 6.0 to 7.0 being more preferred and a pH of 6.6 to 6.8 being most preferred.

As used herein, the term "beverage" refers to a liquid composition which is in a single-strength, ready-to-serve, drinkable form (RTF). Beverages of the present invention typically comprise at least 70% by weight, preferably at least 80% by weight water. Beverages contemplated within the scope of this invention may also be obtained from adding water to concentrates and powders.

As used herein, the term "comprising" or "comprises" means various components can be cojointly employed in the beverages and concentrates of the present invention. Accordingly, the more restrictive terms "consisting essentially of" and "consisting of" are embodied in the term "comprising".

The organic rice protein concentrate useful in this invention can be supplied by a limited number of commercial sources which do not use pesticides, herbicides and inorganic fertilizers to grow the rice. Rice protein concentrate is greater than 70% protein by weight and contains very low levels of fat. Commercially available sources of rice protein concentrate that are useful in the present invention are available from California Natural Products, Lathop, Calif. Preferably, the inventive beverage has rice protein concentrate present in the range from about 1.5 to about 4.5 gms per 100 kcal of RTF formula.

The carbohydrate may be any carbohydrate source appropriate for use in organic beverages. However, one preferred source of organic carbohydrate is brown rice syrup. It has been found that the use of brown rice syrup is highly effective in masking the offensive flavors from the vitamins and minerals added to the beverage. Further, brown rice syrup provides a nutritional benefit compared to the empty calories associated with refined sources of carbohydrate such as sucrose and corn syrup solids. Refined sugars upon consumption go directly into the blood stream where they spike insulin levels, promote excess fat storage, elevate triglycerides, affect brain chemistry and impair absorption of trace minerals. In contrast to the simple sugar profiles of refined sugars and maltodextrins, the most preferred carbohydrate profile of the rice syrup preferred in this formulation (42 DE, dextrose equivalent, rice syrup) is approximately 0.1% fat; 0.5% protein; 0.3% ash; 20% moisture; 79% carbohydrate (of which only 30% is sugars and 49% is more complex other carbohydrates). A preferred sugar profile of 42 DE rice syrup is 0.1% fructose; 6.1% glucose; 0.1% sucrose; 24.1% maltose; 0.0% lactose. It is preferred that the organic nutritional beverage comprise about 5.5–15 grams of brown rice syrup per 100 kcal of formula and most preferably from about 7.5–11.5 grams per 100 kcal of RTF formula.

The lipid content of the inventive beverage is from about 1.5–4.5 grams per 100 kcal of beverage. The major portion of the lipid is preferably provided from organically prepared soy bean oil, high oleic sunflower oil and coconut oil. Certified organic oils are preferred from non-genetically modified seeds. These oils are expeller pressed and not hexane extracted. The use of hexane to prepare edible oils is known to leave traces of residual hexane, which is unacceptable in the beverage according to this invention. Those skilled in the art will appreciate that other organic lipids can be used in the inventive beverage. Representative of another source of lipid or fatty acids that can be used in the beverage include fish oils which have high levels of certain polyunsaturated fatty acids. Fish oils are rich in fatty acids such as eicosapentaenoic acid (EPA) and docosahexaenoic acid (DHA). These fatty acids are characterized by having a double bond in the w-3-position. Arachidonic and linolenic acids are also useful fatty acids in the beverage according to the invention.

An additional aspect of the invention relates to simultaneously achieving an organic nutritional beverage that uses brown rice syrup as a novel source of carbohydrate and which contains a nutritionally significant level of vitamins. Those skilled in the nutritional arts will readily appreciate what vitamins can be used to accomplish the vitamin fortification. Representative of the vitamins useful in the present invention are niacinamide, D-calcium pantothenate, pyridoxine hydrochloride, riboflavin, thiamin mononitrate, folic acid, biotin and cyanocobalamin. The beverage of the present invention may also be supplemented with the amino acids L-methionine, L-carnitine and taurine and the oil soluble vitamins A, D, E and K.

It has been determined that to achieve the beverage's pleasant taste and mouthfeel that the use of soy lecithin is preferred as a source of lipid and an emulsifier/stabilizer. The amount of soy lecithin can range from 0.01 to 0.1 grams per 100 kcal of beverage. This approach is contrary to conventional wisdom which suggests that when high levels of calcium are added to a beverage, a conventional stabilizer should also be used. The prior art teaches that pectins, algins, hydrolyzed starches, xanthan gum and other edible gums be added. The use of these materials is contrary to the present invention as these gums cannot be organically produced. Thus, one aspect of the present invention resides in the use of an organic brown rice syrup in combination with soy lecithin to produce a beverage with high levels of calcium, a pleasant, clean tasting character, and a smooth, creamy texture.

Further, in yet a more preferred embodiment, the beverage according to the invention uses a stabilizer blend consisting of guar and CMC gums to complex with and react with the rice protein to help create a more stable emulsion upon powder reconstitution.

Further, in yet a more preferred embodiment, the beverage according to the invention uses expeller pressed oils for the source of lipid. These oils are especially preferred as they have no residual extraction solvent present.

In one embodiment the beverage according to this invention can be prepared with the following ranges of properties and components:

| ITEM | RANGE PER 1 LITER SERVING AS FED | |
|---|---|---|
| | GENERAL | PREFERRED |
| Energy (kcal) | 500–900 | 600–800 |
| Protein (gm) | 10–30 | 17–23 |
| Carbohydrate (gm) | 50–110 | 65–85 |
| Fat (gm) | 20–55 | 32–42 |
| Calcium (mg) | 700–1500 | 850–1050 |
| Iron (mg) | 2–22 | 7–17 |
| Vitamin C (mg) | 100–200 | 120–160 |
| Vitamin $B_1$ (mcg) | 500–900 | 600–800 |
| Vitamin $B_2$ (mcg) | 500–900 | 600–800 |
| Niacin (mcg) | 6700–8700 | 7250–8250 |
| Vitamin $B_6$ (mcg) | 350–550 | 380–470 |
| Folic Acid (mcg) | 50–150 | 80–120 |
| Vitamin $B_{12}$ (mcg) | 0.5–5 | 2.5–3.5 |
| Biotin (mcg) | 10–40 | 15–25 |
| Pantothenic Acid (mcg) | 2500–4000 | 2900–3500 |
| Vitamin A (IU) | 1800–2400 | 2000–2200 |
| Vitamin D (IU) | 300–600 | 370–470 |
| Vitamin E (IU) | 5–25 | 10–20 |
| Vitamin K (mcg) | 40–80 | 50–70 |

The beverage according to the invention would be especially beneficial for toddlers/children of 1–10 years of age. Various modifications of components, such as the number and type of lipids, can be made without departing from the fundamental discovery that use of organic rice protein concentrate, organic brown rice syrup and a source of calcium selected from mono, di and tricalcium phosphate, calcium lactate, calcium gluconate and mixtures thereof, can produce a physically stable and good tasting nutritional beverage. In a further aspect of the invention, it has been discovered that the use of brown rice syrup as the predominate source of carbohydrate improves the flavor of the beverage by effectively masking the objectionable flavors of the vitamins and minerals. Further, even though the rice syrup has a DE of about 42, the sweetness is acceptable and comparable to cow's milk without being over powering. Additionally, it is believed that the beverage according to the invention is the first nutritional beverage to use organic rice protein concentrate and expeller pressed oils as the source of lipid.

DETAILED DESCRIPTION OF THE PREFERRED EMBODIMENTS

In accordance with the foregoing summary of the invention, the following Example I is one embodiment of the beverage of the present invention and a method of its production. In Example I the following bill of materials was utilized.

Bill of Materials

| Ingredient | Gms per Batch | Gms per 100 kcal |
|---|---|---|
| Rice Protein Concentrate* | 4141.6 | 3.451 |
| Tricalcium Phosphate | 420.5 | 0.17 |
| Dimagnesium Phosphate | 120.0 | 0.100 |
| Brown Rice Syrup* | 17476.6 | 14.562 |
| HO Sunflower Oil* | 2598.6 | 2.165 |
| Coconut Oil* | 1070.2 | 0.892 |
| Soy Oil* | 1628.6 | 1.357 |
| Soy Lecithin | 53.5 | 0.045 |
| Vanilla Flavor | 75.0 | 0.062 |
| Oil Soluble Vitamin Premix | 60.0 | 0.050 |
| Water Soluble Vitamin Premix | 198.02 | 0.165 |
| Calcium Hydroxide | 41.77 | .035 |
| Stabilizer Blend | 53.8 | .045 |
| TOTAL | 21544 | 23.248 |

*materials were certified organic

To convert from gms per 100 kcal to 100 ml of RTF beverage one multiplies the gms per 100 kcal by 0.7 to arrive at per 100 ml of RTF. To convert from gms per 100 kcal to 100 gms of powder one uses 4.8005 as the factor. The organic rice protein concentrate was obtained from California Natural Products of Lathrop, Calif.; the organic soy, organic HO (high oleic) sunflower and organic coconut oils were obtained from Spectrum Commodities of Petaluma, Calif.; the soy lecithin was obtained from Central Soya Company, Inc., Fort Wayne, Ind.; the organic brown rice syrup was obtained from California Natural Products of Lathrop, Calif.; the natural vanilla flavor was obtained from Givaudan of Cincinnati, Ohio; the stabilizer blend was obtained from TIC Gums of Belcamp, Md.; and the water soluble vitamin premix and oil soluble vitamin premix were supplied by Fortitech, Inc. of Schenectady, N.Y.

EXAMPLE I

Production of Beverage Containing Rice Protein Concentrate and Organic Brown Rice Syrup A 25.00 kg batch of powder was manufactured using the process described below. In the first step, an appropriate amount of warm water (120–130° F.) was added to a blend tank containing the rice protein concentrate. This was followed by the tricalcium phosphate and the dimagnesium phosphate. Mixing occurred until the tricalcium phosphate and dimagnesium phosphate and the rice protein concentrate were completely wetted and dispersed. The brown rice syrup was then added to the tank and agitation continued for 35 minutes. In a separate kettle the HO sunflower oil and the soybean oil were heated to 120–130° F. and then the solid coconut oil was added. Mixing continued until the lipid slurry was homogenous. The lecithin was then added, followed by the oil soluble vitamin premix. The oil blend was then added to the protein/carbohydrate slurry and this mixture was then heated to 150° F. The water soluble vitamin premix was dissolved in 150 gms of warm water and then added to the protein/carbohydrate/oil slurry and mixed for 5 minutes. The pH was checked and adjusted to 6.65–6.85 with 10% by weight calcium hydroxide solution. KOH could also be used. Mixing continued for an additional 25 minutes and then the blend was heated to 160° F. The vanilla flavor was then added. The blend was about 50% by weight total solids.

The blend was prepared for spray drying by first homogenizing at 2500/500 psi and then placing the blend in the spray dryer balance tank. The spray dryer used a 2000 psi nozzle pressure (a 72/1000 nozzle), with a 258° F. inlet temperature and an outlet temperature of 250° F. The resulting powder (1.7% water by weight) was fine, slightly tan in color and reconstituted readily. The stabilizer blend was then dry blended into the powder. The powder was then placed in metal cans flushed with a mixture of carbon dioxide and nitrogen.

The beverage of the present invention can be made in a ready to consume form or in the form of a concentrate. The nutritional beverage of the present invention, due to its use of brown rice syrup, has been found to produce a refreshing, pleasant tasting beverage with excellent mouthfeel and smooth texture.

INDUSTRIAL APPLICABILITY

Some patients, infants and toddlers in need of nutritional supplementation simply do not like or should not be exposed to the chemical residues that are present in commercially available nutritional products. The product of this invention will also offer patients, infants and toddlers in need of calcium and/or iron supplementation a new supplement that will improve intake and thereby improve nutritional status. The organic product of this invention provides a high level of nutritional value in a beverage which will be found useful in the medical community and readily accepted by parents of infants that know the value of organic products.

In accordance with the foregoing disclosure, it will be within the ability of one skilled in the relevant arts to make modifications to the present invention, such as through the substitution of equivalent materials and/or their amounts, without departing from the spirit of the invention as reflected in the appended claims.

We claim:

1. A ready-to-feed nutritional beverage comprising:
   a) water;
   b) from about 10 to about 30 gms of an organic rice protein per liter of beverage;
   c) from about 5.5 to about 15 gms of an organic brown rice syrup per liter of beverage;
   d) from about 700 to about 1500 mgs per liter of beverage of a source of calcium selected from mono, di and tricalcium phosphate, calcium lactate, calcium gluconate and mixtures thereof;
   e) from about 0.20 to about 0.40% of a stabilizer blend consisting of guar and CMC gums to react with and stabilize the protein system about 0.20 to about 0.40% of a stabilizer blend consisting of guar and CMC gums to react with and stabilize the protein system;
   f) soy lecithin;
   g) oil and water soluble vitamins; and
   h) an organic lipid.

2. The beverage according to claim 1 wherein said source of calcium is a calcium salt.

3. The beverage according to claim 1 wherein said beverage additionally comprises:
   a) at least one element selected from the group consisting of pantothenic acid, biotin, vitamin B12, folic acid, vitamin 6, vitamin B2, vitamin 1, and a source of bioavailable iron; and
   b) from about 15 to about 25 gms of at least one source of organic rice protein concentrate per liter of beverage.

4. The beverage according to claim 1 wherein said beverage is in the form of a concentrate or a powder.

5. The beverage according to claim 1 wherein said organic brown rice syrup has a DE of at least 25.

6. An organic nutritional beverage comprising:
a) rice protein concentrate;
b) calcium salts;
c) brown rice syrup;
d) high oleic sunflower oil;
e) coconut oil;
f) soy bean oil;
g) soy lecithin;
h) flavor;
i) oil soluble vitamins;
j) water soluble vitamins; and
k) a stabilizer blend.

7. A nutritional beverage according to claim 6 additionally containing at least one of either arachidonic acid (ARA) and docosahexaenoic acid (DHA).

* * * * *